(12) United States Patent
Sawada

(10) Patent No.: US 12,536,697 B2
(45) Date of Patent: Jan. 27, 2026

(54) INFERENCE DEVICE, INFERENCE METHOD, AND NON-TRANSITORY COMPUTER-READABLE MEDIUM

(71) Applicant: Mitsubishi Electric Corporation, Tokyo (JP)

(72) Inventor: Tomoya Sawada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 408 days.

(21) Appl. No.: 18/028,953

(22) PCT Filed: Aug. 2, 2022

(86) PCT No.: PCT/JP2022/029598
§ 371 (c)(1),
(2) Date: Mar. 28, 2023

(87) PCT Pub. No.: WO2023/277201
PCT Pub. Date: Jan. 5, 2023

(65) Prior Publication Data
US 2024/0046512 A1 Feb. 8, 2024

(51) Int. Cl.
*G06T 7/73* (2017.01)
*G06T 5/70* (2024.01)
(Continued)

(52) U.S. Cl.
CPC ............ *G06T 7/74* (2017.01); *G06T 5/70* (2024.01); *G06T 7/11* (2017.01); *G06V 10/62* (2022.01);
(Continued)

(58) Field of Classification Search
None
See application file for complete search history.

(56) References Cited

U.S. PATENT DOCUMENTS

2019/0303746 A1 10/2019 Saruta et al.
2020/0364570 A1 11/2020 Kitamura
(Continued)

FOREIGN PATENT DOCUMENTS

JP 2018-205858 A 12/2018
JP 2019-185127 A 10/2019
(Continued)

OTHER PUBLICATIONS

Caesar et al., "nuScenes: a Multimodal Dataset for Autonomous Driving." arxiv.org, Cornell University Library, Mar. 26, 2019, 16 pages total.
(Continued)

*Primary Examiner* — Leon Viet Q Nguyen
(74) *Attorney, Agent, or Firm* — Birch, Stewart, Kolasch & Birch, LLP

(57) ABSTRACT

An image signal indicating a target image is acquired when a domain of the target image is different from that of a training image or a recognition task of the target image is different from a pre-learned task. The image signal is provided to a trained learning model. An inference time feature amount obtained by combining feature amounts of the detection target after the feature amounts are blurred is acquired from the learning model. A three-dimensional position of the detection target is estimated on the basis of a representative feature amount being a registered feature amount of the detection target appearing in an image for conversion whose domain and recognition task of the image are the same as those of the target image, and the inference time feature amount. A temporal positional change of the detection target in the target image is analyzed on the basis of the estimated position.

6 Claims, 6 Drawing Sheets

(51) Int. Cl.
  *G06T 7/11* (2017.01)
  *G06V 10/62* (2022.01)
  *G06V 10/764* (2022.01)
  *G06V 10/77* (2022.01)
  *G06V 10/774* (2022.01)
  *G06V 10/82* (2022.01)

(52) U.S. Cl.
  CPC ........ *G06V 10/764* (2022.01); *G06V 10/7715* (2022.01); *G06V 10/774* (2022.01); *G06V 10/82* (2022.01); *G06T 2207/20081* (2013.01); *G06T 2207/20084* (2013.01); *G06T 2207/30192* (2013.01)

(56) References Cited

U.S. PATENT DOCUMENTS

| | | | |
|---|---|---|---|
| 2022/0092475 A1 | 3/2022 | Sogowa et al. | |
| 2022/0335291 A1* | 10/2022 | Sawada | G06T 7/00 |
| 2023/0326041 A1* | 10/2023 | Babazaki | G06T 7/248 |
| | | | 382/103 |
| 2024/0428551 A1* | 12/2024 | Piao | G06V 10/82 |

FOREIGN PATENT DOCUMENTS

| | | |
|---|---|---|
| JP | 2019-211913 A | 12/2019 |
| JP | 2020-119154 A | 8/2020 |
| JP | 2021-110973 A | 8/2021 |
| WO | WO 2019/167884 A1 | 9/2019 |
| WO | WO 2020/144853 A1 | 7/2020 |

OTHER PUBLICATIONS

Korean Office Action for Korean Application No. 10-2023-7012153, dated Sep. 1, 2025, with English translation.

Krizhevsky et al., "ImageNet Classification with Deep Convolutional Neural Networks," Advances in neural information processing systems, 25th Annual Conference on Neural Information Processing Systems 2011, vol. 60, No. 6, Jan. 1, 2012, pp. 1-9.

Lang et al., "PointPillars: Fast Encoders for Object Detection from Point Clouds," arxiv.org, Cornell University Library, Dec. 14, 2018, pp. 12697-12705.

* cited by examiner

FIG. 9
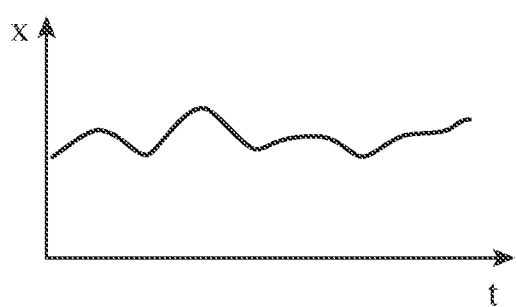
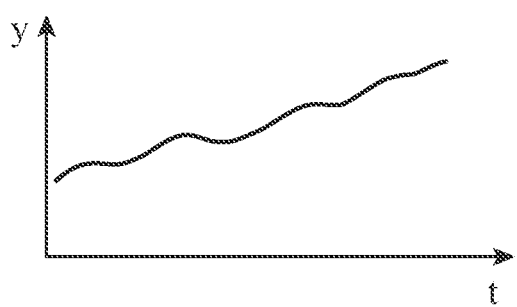
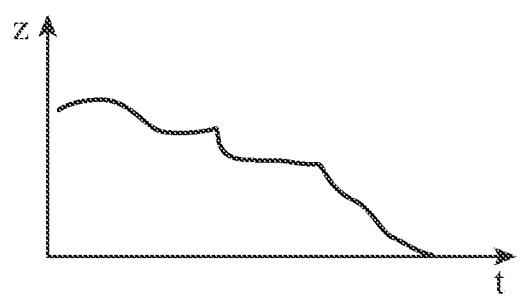

INFERENCE DEVICE, INFERENCE METHOD, AND NON-TRANSITORY COMPUTER-READABLE MEDIUM

TECHNICAL FIELD

The present disclosure relates to an inference device, an inference method, and a non-transitory computer-readable medium.

BACKGROUND ART

For example, Patent Literature 1 discloses an abnormality detection method for detecting occurrence of an abnormality in an autonomous moving device. In the abnormality detection method, occurrence of an abnormality in the autonomous moving device is detected using each of a sensor group and a control unit.

The sensor group detects a current state of the autonomous moving device. The control unit acquires, from the sensor group, time-series data that is sensor data from the detection start time point to the current time point. The control unit generates a plurality of pieces of divided data by dividing the time series data at each first predetermined interval, and generates a plurality of graphs from the plurality of pieces of divided data and the time series data. In addition, the control unit provides the plurality of graphs to a learning model and acquires a detection result of occurrence of an abnormality from the learning model. The detection result of occurrence of abnormality includes an abnormal position of the autonomous moving device.

CITATION LIST

Patent Literature

Patent Literature 1: JP 2021-110973 A

SUMMARY OF INVENTION

Technical Problem

In a case where the autonomous moving device is a flying object, the navigation of the autonomous moving device is affected by a state change of a natural environment. The state of the natural environment includes, for example, the strength of wind, the direction of wind, the presence or absence of rain, the amount of rainfall, the presence or absence of snow, or the amount of snow.

In the abnormality detection method disclosed in Patent Literature 1, in order to enable detection of occurrence of an abnormality in the autonomous moving device regardless of how the state of the natural environment changes, it is necessary to learn a learning model in consideration of all the states of the natural environment assumed during the time of navigation of the autonomous moving device. However, in order to learn a learning model in consideration of all the states of the natural environment, it is necessary to prepare an extremely large amount of training data, and practically, it may not be possible to prepare sufficient training data. Therefore, the abnormality detection method has a problem that occurrence of an abnormality in the autonomous moving device cannot be detected depending on the state of the natural environment.

The present disclosure has been made to solve the above problem, and an object of the present disclosure is to obtain an inference device capable of analyzing a temporal change in a three-dimensional position of a detection target object without learning of a learning model in consideration of a state of a natural environment.

Solution to Problem

An inference device according to the present disclosure includes: processing circuitry to acquire an image signal indicating an inference target image that is an image in which a detection target object appears in a case where one or more of a condition that a domain of the inference target image is different from a domain of a training image and a condition that a recognition task of the inference target image is different from a pre-learned task are satisfied, to provide the image signal to a first learning model in which learning of the training image has been completed, and acquire, from the first learning model, an inference time feature amount that is obtained by combining a plurality of feature amounts of the detection target object appearing in the inference target image after each of the plurality of feature amounts is blurred, the inference time feature amount being to be used for inferring a three-dimensional position of the detection target object, to perform estimation of a three-dimensional position of the detection target object appearing in the inference target image on a basis of a representative feature amount that is a registered feature amount of the detection target object appearing in an image for conversion in which each of a domain and a recognition task of the image is the same as that of the inference target image, and the inference time feature amount, and to analyze a temporal change in a three-dimensional position of the detection target object appearing in the inference target image on a basis of an estimation result of the three-dimensional position.

Advantageous Effects of Invention

According to the present disclosure, it is possible to analyze a temporal change in the three-dimensional position of the detection target object without learning of a learning model in consideration of the state of a natural environment.

BRIEF DESCRIPTION OF DRAWINGS

FIG. 3 is a hardware configuration diagram of a computer in a case where the inference device 4 is implemented by software, firmware, or the like.

FIG. 6 is a hardware configuration diagram of a computer in a case where the learning device 7 is implemented by software, firmware, or the like.

FIG. 9 is an explanatory diagram illustrating a temporal change in a three-dimensional position of a detection target object.

DESCRIPTION OF EMBODIMENTS

In order to explain the present disclosure in more detail, a mode for carrying out the present disclosure will be described below with reference to the accompanying drawings.

First Embodiment

Figure 1:
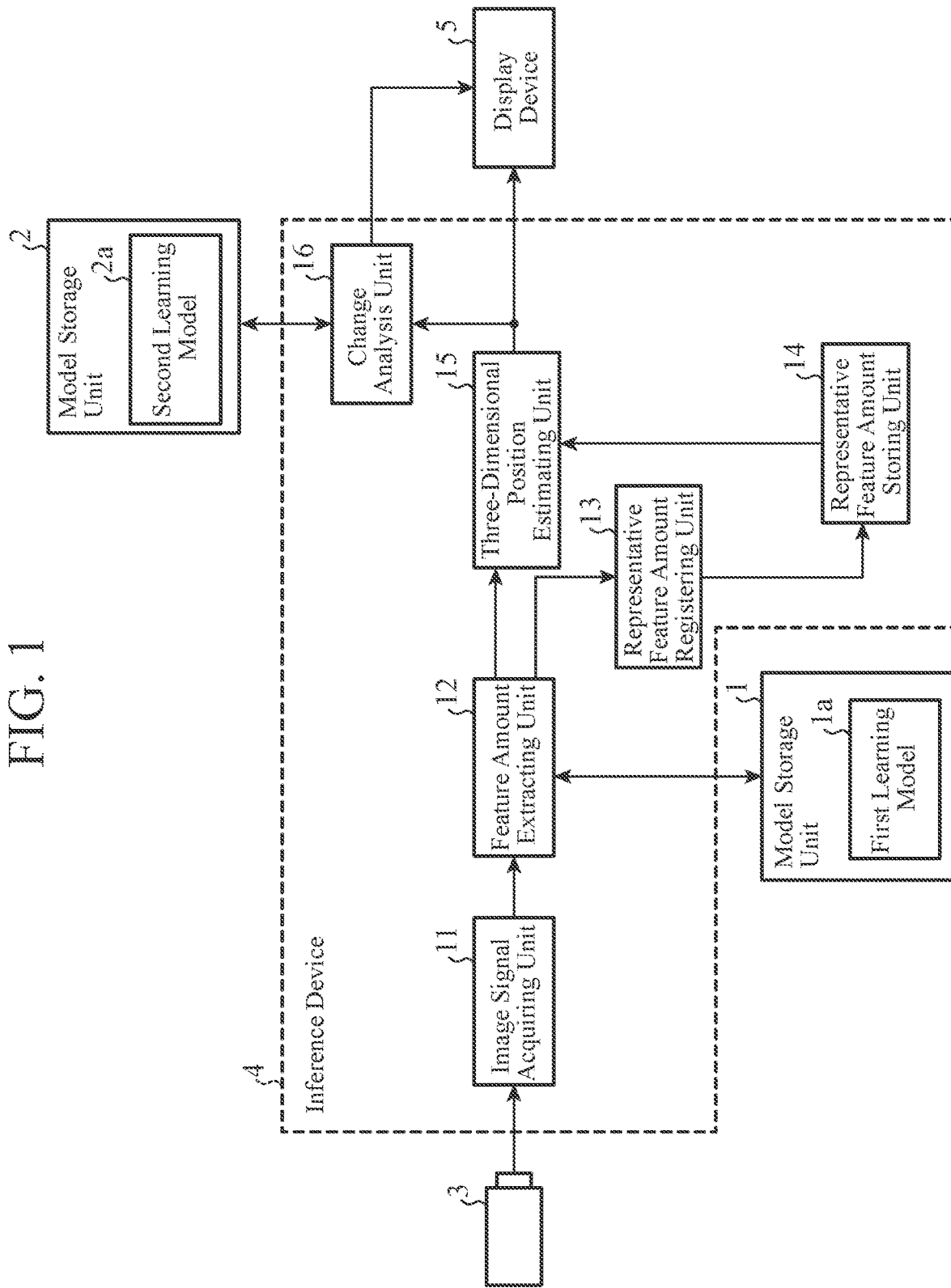
FIG. 1 is a configuration diagram illustrating an inference device 4 according to a first embodiment.

FIG. 1 is a configuration diagram illustrating an inference device 4 according to a first embodiment.

Figure 2:
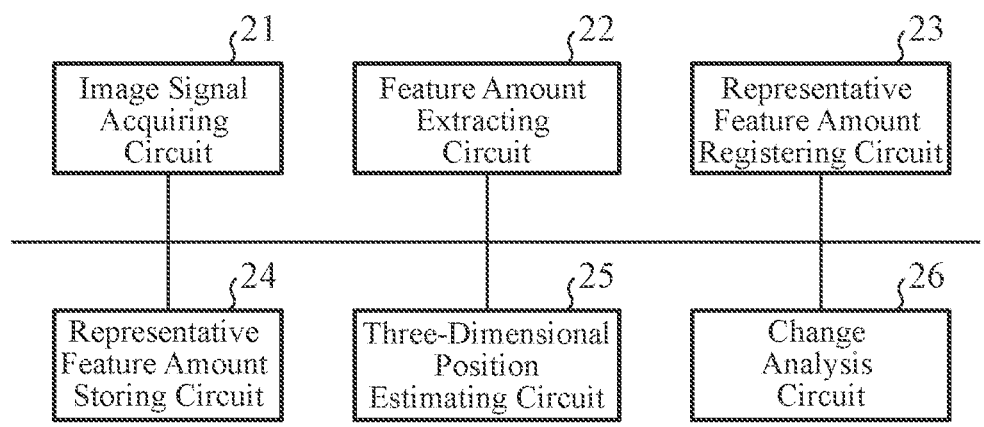
FIG. 2 is a hardware configuration diagram illustrating hardware of the inference device 4 according to the first embodiment.

FIG. 2 is a hardware configuration diagram illustrating hardware of the inference device 4 according to the first embodiment.

In FIG. 1, a model storage unit 1 is implemented by, for example, a hard disk or a random access memory (RAM).

The model storage unit 1 stores a first learning model 1a.

The first learning model 1a is implemented by, for example, a multilayer neural network (Deep Neural Networks: DNNs). The DNNs include Convolutional Neural Networks (CNNs).

In the learning model 1a, an image signal indicating a training image is provided as training data at the time of learning, and learning of the training image is completed. The training image is, for example, an image used for an image recognition task.

The type of the image that is a domain of the training image may be any type, and the training image is, for example, any of an RGB image, a TIR image, or an image generated by a CG simulator.

In an inference device 34 illustrated in FIG. 1, for convenience of description, it is assumed that the training image is an RGB image. The learning model 1a receives a large number of RGB images to learn the RGB images.

In a case where each of a domain and a recognition task of an image is different from that of a training image, when an image signal indicating an image for conversion that is an image in which a detection target object appears is provided from a feature amount extracting unit 12 described later, the learning model 1a outputs, to the feature amount extracting unit 12, a feature vector indicating a feature amount that is obtained by combining a plurality of feature amounts of the detection target object appearing in the image for conversion after each of the plurality of feature amounts is blurred, the feature amount being used for inference of a three-dimensional position of the detection target object.

The image for conversion may be an image in which one or more of a domain and a recognition task of the image are different from those of the training image. In the inference device 4 illustrated in FIG. 1, for convenience of description, the description will be given assuming that the image for conversion is a TIR image.

The CNNs implementing the first learning model 1a are very deep CNNs. As very deep CNNs, for example, there is ResNet having 101 layers. Therefore, for example, at the time of estimating the three-dimensional position, when an image signal is provided to the input layer of the first learning model 1a, the feature amount indicated by the feature vector output from the output layer of the first learning model 1a is a high-dimensional feature amount. The high-dimensional feature amount includes feature amounts of a plurality of dimensions, and for example, a Tensor is used as a feature vector indicating the high-dimensional feature amount.

The low-dimensional feature amount output from a shallow layer among a plurality of stages of hidden layers included in the learning model 1a indicates, for example, color, luminance, or direction. Therefore, the low-dimensional feature amount depends on a domain of an image indicated by the image signal provided to the input layer. That is, the feature amount indicated by the feature vector output from the shallow layer of the learning model 1a when the image signal of the RGB image is provided to the input layer of the learning model 1a may be greatly different from the feature amount indicated by the feature vector output from the shallow layer of the learning model 1a when the image signal of the TIR image is provided to the input layer of the learning model 1a.

On the other hand, the high-dimensional feature amount output from a sufficiently deep intermediate layer of the learning model 1a indicates a conceptual feature expressing quality or the like of the detection target object. Therefore, the high-dimensional feature amount is conceptual information having extremely low dependency on the domain of the image indicated by the image signal provided to the input layer. In addition, by adopting a high-dimensional feature of a deeper layer, it is possible to acquire general-purpose information having low dependency on a task. As a feature of a conceptual object, for example, "Objectness" or "Informativeness" is known.

That is, a difference between the high-dimensional feature amount indicated by the feature vector output from the output layer of the learning model 1a when the image signal of the RGB image is provided to the input layer of the learning model 1a and the high-dimensional feature amount indicated by the feature vector output from the output layer of the learning model 1a when the image signal of the TIR image is provided to the input layer of the learning model 1a is small.

Therefore, in a case where the learning model 1a is implemented by CNNs and the inference device 3 uses a high-dimensional feature amount indicated by the feature vector output from a sufficiently deep intermediate layer of CNNs, dependency on the domain and dependency on the recognition task of the image indicated by the image signal provided to the input layer are reduced.

A model storage unit 2 is implemented by, for example, a hard disk or a RAM.

The model storage unit 2 stores a second learning model 2a.

The second learning model 2a is implemented by, for example, recurrent neural networks (RNNs).

The second learning model 2a is a learning model of free learning, and is a learning model that learns a three-dimensional position and regresses a temporal change in the three-dimensional position.

When a three-dimensional position estimation result by the three-dimensional position estimating unit 15 described later is provided from the change analysis unit 16 described later, the second learning model 2a outputs a signal indicating a three-dimensional position of a detection target object at future time to the change analysis unit 16 as position data indicating a temporal change in the three-dimensional position of the detection target object.

In the inference device 4 illustrated in FIG. 1, each of the first learning model 1a and the second learning model 2a is provided outside the inference device 4. However, this is merely an example, and for example, the first learning model 1a may be built in the feature amount extracting unit 12 and the second learning model 2a may be built in the change analysis unit 16.

The detection target object is, for example, a drone, a flying car, a helicopter, an automobile, or a ship. In the inference device 4 illustrated in FIG. 1, an example in which a detection target object is recognized as any of a drone, a flying car, and a helicopter will be described for convenience of description.

In addition, in the inference device 4 illustrated in FIG. 1, with respect to a three-dimensional position of the detection target object to be recognized by the three-dimensional position estimating unit 15, for example, the three-dimensional position estimating unit 15 acquires a representative feature amount including a presence range (Objectness) of the detection target object from a representative feature amount storing unit 14 in which a feature vector including the presence range (Objectness) of the object in a high-dimensional feature is registered, compares the representative feature amount with the inference time feature amount extracted by the feature amount extracting unit 12, and specifies a representative feature amount corresponding to the inference time feature amount extracted by the feature amount extracting unit 12 among the representative feature amounts of a plurality of detection target objects. The class having the most similar representative feature amount is a class to which the detection target object belongs. Furthermore, since the inference time feature amount includes the presence range (Objectness) of the detection target object included in the image input at the time of inference, it is possible to represent the spatial presence position of the object by converting the description method of the high-dimensional feature of the inference time feature amount from a Tensor or the like into a two-dimensional space.

In a case where the detection target object is recognized as any of the drone, the flying car, and the helicopter, the training data provided to the first learning model 1a is training data including an image signal indicating a training image. The training image is assumed to be an RGB image for convenience of description.

The training data provided to the second learning model 2a is an estimation result of the three-dimensional position estimated by the three-dimensional position estimating unit 15.

When the estimation result of the three-dimensional position is provided, the second learning model 2a learns the three-dimensional position and regresses the temporal change in the three-dimensional position.

A camera 3 is implemented by, for example, an infrared camera.

The camera 3 images a detection target object.

When the inference device 4 registers an image of a domain different from that at the time of learning (hereinafter referred to as "at the time of domain conversion"), the camera 3 outputs, for example, an image signal indicating a TIR image in which a detection target object appears to the inference device 4 as an image signal indicating an image for conversion in which the detection target object appears.

When the inference device 4 estimates the three-dimensional position of the detection target object, the camera 3 outputs, for example, an image signal indicating a TIR image in which the detection target object appears to the inference device 4 as an image signal indicating an inference target image in which the detection target object appears.

In FIG. 1, the camera 3 outputs an image signal indicating an image for conversion to the inference device 4. However, this is merely an example, and the image signal may be output to the inference device 4 from a storage unit (not illustrated) that stores an image signal indicating the image for conversion in which the detection target object appears.

An image signal acquiring unit 11 is implemented by, for example, an image signal acquiring circuit 21 illustrated in FIG. 2.

At the time of domain conversion, the image signal acquiring unit 11 acquires, from the camera 3, an image signal indicating an image for conversion in which a detection target object appears.

Then, the image signal acquiring unit 11 outputs an image signal indicating the image for conversion to the feature amount extracting unit 12.

At the time of position estimation, the image signal acquiring unit 11 acquires, from the camera 3, an image signal indicating an inference target image in which a detection target object appears.

Then, the image signal acquiring unit 11 outputs an image signal indicating the inference target image to the feature amount extracting unit 12.

The image for conversion and the inference target image have the same type of image, and are both TIR images, for example.

The feature amount extracting unit 12 is implemented by, for example, a feature amount extracting circuit 22 illustrated in FIG. 2.

At the time of domain conversion, the feature amount extracting unit 12 provides the image signal acquired by the image signal acquiring unit 11 to the first learning model 1a, and acquires, from the first learning model 1a, a feature vector indicating a representative feature amount that is obtained by combining a plurality of feature amounts of the detection target object appearing in the image for conversion after each of the plurality of feature amounts is blurred. The representative feature amount is used for inferring the three-dimensional position of the detection target object.

The feature amount extracting unit 12 outputs the feature vector to a representative feature amount registering unit 13.

At the time of position estimation, the feature amount extracting unit 12 provides the image signal acquired by the image signal acquiring unit 11 to the first learning model 1a, and acquires, from the first learning model 1a, a feature vector indicating an inference time feature amount that is obtained by combining a plurality of feature amounts of the detection target object appearing in the inference target image after each of the feature amounts is blurred. The inference time feature amount is used for inferring the three-dimensional position of the detection target object.

The feature amount extracting unit 12 outputs the feature vector to the three-dimensional position estimating unit 15.

As processing of blurring each of the plurality of feature amounts, "Pooling Operation" is known.

The representative feature amount registering unit 13 is implemented by, for example, a representative feature amount registering circuit 23 illustrated in FIG. 2.

The representative feature amount registering unit 13 registers the representative feature amount acquired by the feature amount extracting unit 12.

That is, the representative feature amount registering unit 13 acquires a feature vector indicating the feature amount of a drone present in a certain region, and stores the feature vector in the representative feature amount storing unit 14.

Furthermore, the representative feature amount registering unit 13 acquires a feature vector indicating the feature amount of a flying car present in a certain region, and stores the feature vector in the representative feature amount storing unit 14.

In addition, the representative feature amount registering unit 13 acquires a feature vector indicating the feature amount of a helicopter present in a certain region, and stores the feature vector in the representative feature amount storing unit 14.

The representative feature amount storing unit 14 is implemented by, for example, a representative feature amount storing circuit 24 illustrated in FIG. 2.

The representative feature amount storing unit 14 stores a feature vector indicating the representative feature amount.

The three-dimensional position estimating unit 15 is implemented by, for example, a three-dimensional position estimating circuit 25 illustrated in FIG. 2.

The three-dimensional position estimating unit 15 acquires the feature vector indicating the feature amount of the detection target object appearing in the inference target image from the feature amount extracting unit 12, and acquires the feature vector indicating the representative feature amount from the representative feature amount storing unit 14.

The three-dimensional position estimating unit 15 estimates the three-dimensional position of the detection target object appearing in the inference target image on the basis of the representative feature amount and the feature amount of the detection target object appearing in the inference target image.

Specifically, the three-dimensional position estimating unit 15 recognizes each of the type and the presence region of the detection target object appearing in the inference target image on the basis of the representative feature amount and the inference time feature amount.

Specifically, the three-dimensional position estimating unit 15 acquires the representative feature amount including both the presence range (Objectness) of the detection target object and the type of the object from the representative feature amount storing unit 14 in which the feature vector including both the presence range (Objectness) of the object and the type of the object in the high-dimensional feature is registered, compares the representative feature amount with the inference time feature amount extracted from the feature amount extracting unit 12, and specifies the representative feature amount corresponding to the inference time feature amount extracted by the feature amount extracting unit 12 among the representative feature amounts of the plurality of detection target objects. The class having the most similar representative feature amount is a class to which the detection target object belongs. Furthermore, since the inference time feature amount includes the presence range (Objectness) of the detection target object included in the image input at the time of inference, it is possible to represent the spatial presence position of the object by converting the description method of the high-dimensional feature of the inference time feature amount from a Tensor or the like into a two-dimensional space.

The three-dimensional position estimating unit 15 generates display data indicating a recognition result of the detection target object, and outputs the display data to a display device 5. Here, in a case of being represented as a rectangle on a two-dimensional space, an object detection (Object Detection) task is performed, and in a case of being represented as a region on a two-dimensional space, a segmentation (Sematic Segmentation) task is performed.

The change analysis unit 16 is implemented by, for example, a change analysis circuit 26 illustrated in FIG. 2.

The change analysis unit 16 analyzes a temporal change in the three-dimensional position of the detection target object appearing in the inference target image on the basis of the three-dimensional position estimation result by the three-dimensional position estimating unit 15.

Specifically, the change analysis unit 16 provides the estimation result of the three-dimensional position estimated by the three-dimensional position estimating unit 15 to the second learning model 2a, and acquires position data indicating a temporal change in the three-dimensional position of the detection target object from the second learning model 2a.

Further, in addition to the processing of determining whether or not the detection target object falls on the basis of the position data, the change analysis unit 16 determines whether the detection target object is hovering, ascending, descending, advancing, or retreating, for example, as processing of classifying the detection target object into multiple classes.

The change analysis unit 16 generates display data indicating an analysis result of the temporal change in the three-dimensional position of the detection target object, and outputs the display data to the display device 5.

In addition, the change analysis unit 16 generates display data indicating a determination result of the above determination processing, and outputs the display data to the display device 5.

The display device 5 displays an estimation result of the three-dimensional position on a display (not illustrated) according to the display data output from the three-dimensional position estimating unit 15.

In addition, the display device 5 displays the analysis result of the temporal change in the three-dimensional position of the detection target object and the determination result of the determination processing on a display (not illustrated) according to the display data output from the change analysis unit 16.

In FIG. 1, it is assumed that each of the image signal acquiring unit 11, the feature amount extracting unit 12, the representative feature amount registering unit 13, the representative feature amount storing unit 14, the three-dimensional position estimating unit 15, and the change analysis unit 16, which are components of the inference device 4, is implemented by dedicated hardware as illustrated in FIG. 2. That is, it is assumed that the inference device 4 is implemented by the image signal acquiring circuit 21, the feature amount extracting circuit 22, the representative feature amount registering circuit 23, the representative feature amount storing circuit 24, the three-dimensional position estimating circuit 25, and the change analysis circuit 26.

The representative feature amount storing circuit 24 corresponds to, for example, a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, an optical disk, a compact disk, a mini disk, or a digital versatile disc (DVD).

Each of the image signal acquiring circuit 21, the feature amount extracting circuit 22, the representative feature amount registering circuit 23, the three-dimensional position estimating circuit 25, and the change analysis circuit 26 corresponds to, for example, a single circuit, a composite circuit, a programmed processor, a parallel-programmed processor, an application specific integrated circuit (ASIC), a field-programmable gate array (FPGA), or a combination thereof.

The components of the inference device 4 are not limited to those implemented by dedicated hardware, and the inference device 4 may be implemented by software, firmware, or a combination of software and firmware.

The software or firmware is stored in a memory of a computer as a program. The computer means hardware that executes a program, and corresponds to, for example, a central processing unit (CPU), a graphical processing unit (GPU), a central processor, a processing unit, an arithmetic unit, a microprocessor, a microcomputer, a processor, or a digital signal processor (DSP).

Figure 3:
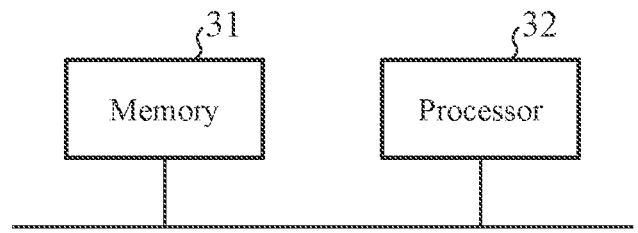

FIG. 3 is a hardware configuration diagram of a computer in a case where the inference device 4 is implemented by software, firmware, or the like.

In a case where the inference device 4 is implemented by software, firmware, or the like, the representative feature amount storing unit 14 is configured on a memory 31 of the computer. A program for causing a computer to execute each processing procedure performed in the image signal acquiring unit 11, the feature amount extracting unit 12, the representative feature amount registering unit 13, the three-dimensional position estimating unit 15, and the change analysis unit 16 is stored in the memory 31. Then, a processor 32 of the computer executes the program stored in the memory 31.

In addition, FIG. 2 illustrates an example in which each of the components of the inference device 4 is implemented by dedicated hardware, and FIG. 3 illustrates an example in which the inference device 4 is implemented by software, firmware, or the like. However, these are merely examples, and some components in the inference device 4 may be implemented by dedicated hardware, and the remaining components may be implemented by software, firmware, or the like.

Figure 4:
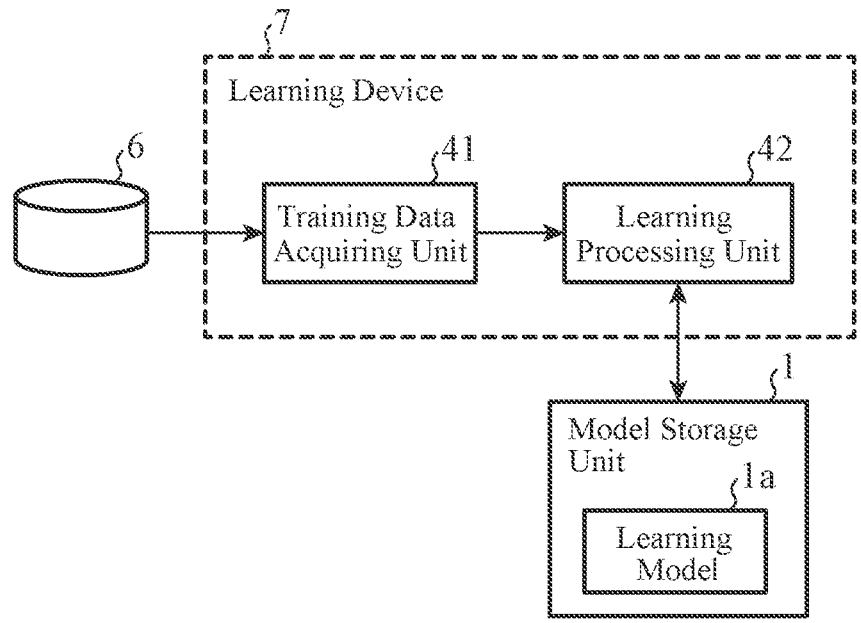
FIG. 4 is a configuration diagram illustrating a learning device 7.

FIG. 4 is a configuration diagram illustrating a learning device 7.

Figure 5:
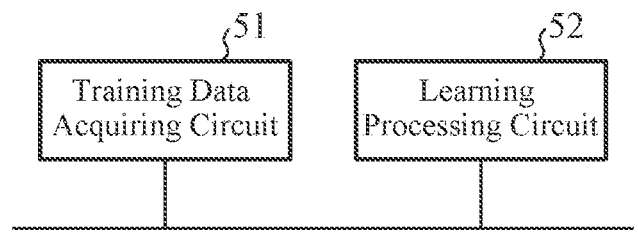
FIG. 5 is a hardware configuration diagram illustrating hardware of the learning device 7.

FIG. 5 is a hardware configuration diagram illustrating hardware of the learning device 7.

A training data storing unit 6 is implemented by, for example, a hard disk or a RAM.

The training data storing unit 6 stores an image signal indicating a training image as training data.

The learning device 7 includes a training data acquiring unit 41 and a learning processing unit 42.

The training data acquiring unit 41 is implemented by, for example, a training data acquiring circuit 51 illustrated in FIG. 5.

The training data acquiring unit 41 acquires training data from the training data storing unit 6.

The training data acquiring unit 41 outputs the training data to the learning processing unit 42.

The learning processing unit 42 is implemented by, for example, a learning processing circuit 52 illustrated in FIG. 5.

The learning processing unit 42 acquires a large amount of training data from the training data acquiring unit 41.

The learning processing unit 42 provides each piece of training data to the learning model 1a and causes the learning model 1a to learn a training image indicated by an image signal included in each piece of training data.

When an image signal is provided at the time of domain conversion or position estimation, the learned learning model 1a outputs a feature vector corresponding to the image signal.

In FIG. 4, it is assumed that each of the training data acquiring unit 41 and the learning processing unit 42, which are components of the learning device 7, is implemented by dedicated hardware as illustrated in FIG. 5. That is, it is assumed that the learning device 7 is implemented by the training data acquiring circuit 51 and the learning processing circuit 52.

Each of the training data acquiring unit 41 and the learning processing unit 42 corresponds to, for example, a single circuit, a composite circuit, a programmed processor, a parallel programmed processor, ASIC, FPGA, or a combination thereof.

The components of the learning device 7 are not limited to those implemented by dedicated hardware, and the learning device 7 may be implemented by software, firmware, or a combination of software and firmware.

Figure 6:
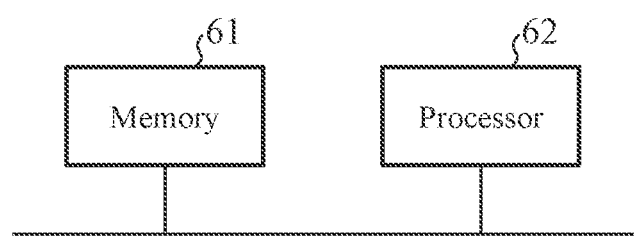

FIG. 6 is a hardware configuration diagram of a computer in a case where the learning device 7 is implemented by software, firmware, or the like.

In a case where the learning device 7 is implemented by software, firmware, or the like, a program for causing a computer to execute each processing procedure performed in the training data acquiring unit 41 and the learning processing unit 42 is stored in a memory 61. Then, a processor 62 of the computer executes the program stored in the memory 61.

Furthermore, FIG. 5 illustrates an example in which each of the components of the learning device 7 is implemented by dedicated hardware, and FIG. 6 illustrates an example in which the learning device 7 is implemented by software, firmware, or the like. However, this is merely an example, and some components in the learning device 7 may be implemented by dedicated hardware, and the remaining components may be implemented by software, firmware, or the like.

First, the operation of the learning device 7 illustrated in FIG. 4 will be described.

A large amount of training data is stored in the training data storing unit 6, and each piece of training data includes an image signal indicating a training image.

The training data acquiring unit 41 of the learning device 7 acquires a large amount of training data from the training data storing unit 6.

The training data acquiring unit 41 outputs each piece of training data to the learning processing unit 42.

The learning processing unit 42 acquires each piece of training data from the training data acquiring unit 41.

The learning processing unit 42 provides each piece of training data to the first learning model 1a and causes the learning model 1a to learn a training image indicated by an image signal included in each piece of training data.

For example, when an image signal indicating an RGB image is provided to the input layer, the learned learning model 1a outputs, from the output layer, a feature vector indicating a high-dimensional feature amount of a detection target object appearing in the RGB image as a feature vector corresponding to the image signal.

In a case where the training image used for learning in the learning model 1a is, for example, an RGB image and the TIR image is not used as the training image, even if both the detection target object appearing in the RGB image and the detection target object appearing in the TIR image are normal and the same object, a feature vector output from the output layer when an image signal indicating the RGB image is provided to the input layer may be different from a feature vector output from the output layer when an image signal indicating the TIR image is provided to the input layer.

However, CNNs that implement the learning model 1a are very deep CNNs, and a feature vector output from a sufficiently deep intermediate layer of the learning model 1a indicates a high-dimensional feature amount. Therefore, the above difference is slight.

In addition, as described above, the feature amount indicated by the feature vector output from the output layer of the learning model 1a is a feature amount obtained by combining the feature amounts of the plurality of layers of the sufficiently deep intermediate layers of the detection target object after each of the plurality of feature amounts of the plurality of layers is blurred. Therefore, the feature amount indicated by the feature vector indicates a robust feature in which each of the dependency of the domain of the image and the dependency of the recognition task is excluded.

Next, the operation of the inference device 4 at the time of domain conversion will be described.

Figure 7:
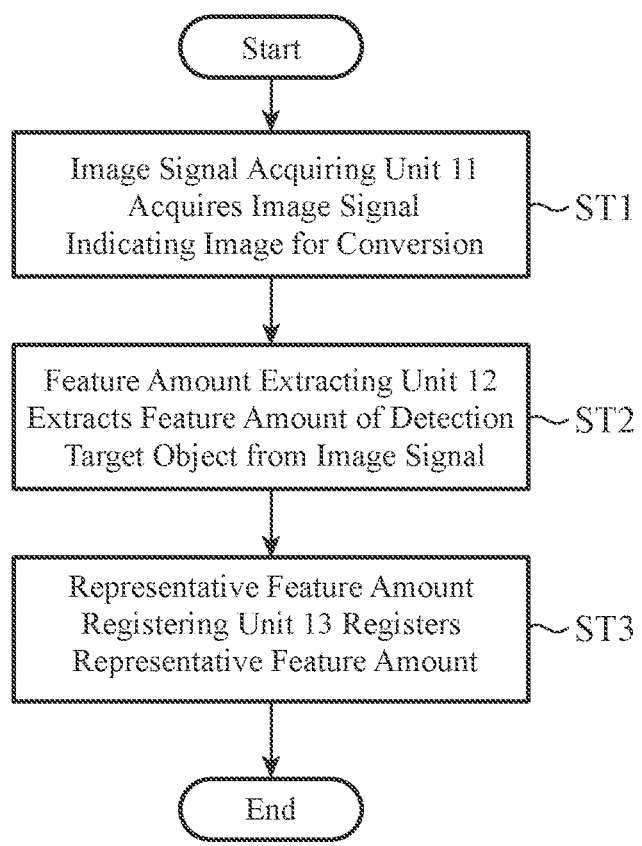
FIG. 7 is a flowchart illustrating a processing procedure performed in the inference device 4 at the time of domain conversion.

FIG. 7 is a flowchart illustrating a processing procedure performed in the inference device 4 at the time of domain conversion.

The camera 3 images a detection target object. The detection target object imaged by the camera 3 is any of a drone, a flying car, and a helicopter. However, the inference device 4 can also classify the detection target object into, for example, 1000. Therefore, it is merely an example to classify the detection target object into three of a drone, a flying car, and a helicopter. In addition, the detection target object imaged by the camera 3 is present in a certain region.

The camera 3 outputs, for example, an image signal indicating a TIR image in which a detection target object appears to the inference device 4 as an image signal indicating an image for conversion in which the detection target object present in the certain region appears.

The image signal acquiring unit 11 acquires, from the camera 3, an image signal indicating an image for conversion in which a detection target object appears (step ST1 in FIG. 7).

Specifically, the image signal acquiring unit 11 acquires, from the camera 3, an image signal indicating the image for conversion in which a drone present in a certain region appears, and outputs the image signal indicating the image for conversion to the feature amount extracting unit 12.

In addition, the image signal acquiring unit 11 acquires, from the camera 3, an image signal indicating an image for conversion in which a flying car present in a certain region appears, and outputs the image signal indicating the image for conversion to the feature amount extracting unit 12.

In addition, the image signal acquiring unit 11 acquires, from the camera 3, an image signal indicating an image for conversion in which a helicopter present in a certain region appears, and outputs the image signal indicating the image for conversion to the feature amount extracting unit 12.

The feature amount extracting unit 12 acquires, from the image signal acquiring unit 11, an image signal indicating an image for conversion in which a detection target object present in the certain region appears.

The feature amount extracting unit 12 extracts the feature amount of the detection target object appearing in each image for conversion from each image signal (step ST2 in FIG. 7).

Specifically, the feature amount extracting unit 12 acquires, from the image signal acquiring unit 11, an image signal indicating an image for conversion in which a drone present in the certain region appears.

The feature amount extracting unit 12 provides each image signal to the first learning model 1a, and acquires, from the first learning model 1a, a feature vector indicating a representative feature amount obtained by combining a plurality of feature amounts of the drone present in the certain region after each of the plurality of feature amounts is blurred.

The feature amount extracting unit 12 outputs the feature vector to the representative feature amount registering unit 13.

In addition, the feature amount extracting unit 12 acquires, from the image signal acquiring unit 11, an image signal indicating an image for conversion in which a flying car present in the certain region appears.

The feature amount extracting unit 12 provides each image signal to the first learning model 1a, and acquires, from the first learning model 1a, a feature vector indicating a representative feature amount obtained by combining a plurality of feature amounts of the flying car present in the certain region after each of the plurality of feature amounts is blurred.

The feature amount extracting unit 12 outputs the feature vector to the representative feature amount registering unit 13.

In addition, the feature amount extracting unit 12 acquires, from the image signal acquiring unit 11, an image signal indicating an image for conversion in which a helicopter present in the certain region appears.

The feature amount extracting unit 12 provides each image signal to the first learning model 1a, and acquires, from the first learning model 1a, a feature vector indicating a representative feature amount obtained by combining a plurality of feature amounts of the helicopter present in the certain region after each of the plurality of feature amounts is blurred.

The feature amount extracting unit 12 outputs the feature vector to the representative feature amount registering unit 13.

The representative feature amount registering unit 13 acquires each feature vector from the feature amount extracting unit 12.

The representative feature amount registering unit 13 registers the representative feature amount by storing each feature vector in the representative feature amount storing unit 14 (step ST3 in FIG. 7).

Here, the feature vector indicating the representative feature amount is represented by a Tensor. The Tensor can represent higher-dimensional information than a Vector, and may be referred to as a feature map.

Since the Tensor can represent high-dimensional information, in a case where the representative feature amount registering unit 13 causes the representative feature amount storing unit 14 to store the feature vector represented by the Tensor as it is, it may take a lot of processing time when the three-dimensional position estimating unit 15 performs matching of the feature vectors.

In order to shorten the processing time required when the three-dimensional position estimating unit 15 performs matching of the feature vectors, the representative feature amount registering unit 13 may convert the feature vector indicating the representative feature amount into a One-hot-vector having a smaller number of dimensions than the Tensor, and cause the representative feature amount storing unit 14 to store the One-hot-vector.

Regardless of whether the feature vector registered by the representative feature amount registering unit 13 is a Tensor or a One-hot-vector, high-dimensional information such as several hundred dimensions is represented. Therefore, even if there are some variations among the plurality of detection target objects having the same type, the feature vector describes a representative feature of the detection target object in a high dimension.

Next, the operation of the inference device 4 at the time of position estimation will be described.

Figure 8:
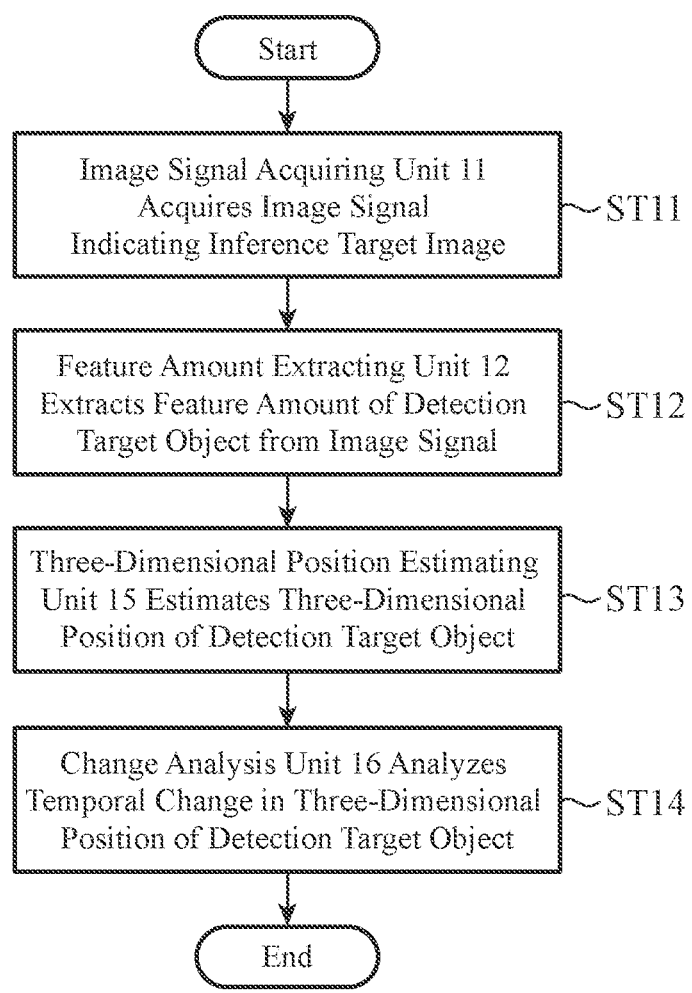
FIG. 8 is a flowchart illustrating an inference method that is a processing procedure performed in the inference device 4 at the time of position estimation.

FIG. 8 is a flowchart illustrating an inference method that is a processing procedure performed in the inference device 4 at the time of position estimation.

The camera 3 images a detection target object. It is unknown whether the detection target object imaged by the camera 3 is a drone, a flying car, or a helicopter. In addition, the region where the detection target object imaged by the camera 3 is present is unknown.

The camera 3 outputs, for example, an image signal indicating a TIR image in which a detection target object appears to the inference device 4 as an image signal indicating an inference target image in which a detection target object appears.

The image signal acquiring unit 11 acquires, from the camera 3, an image signal indicating an inference target image in which a detection target object appears (step ST11 in FIG. 8).

The image signal acquiring unit 11 outputs an image signal indicating the inference target image to the feature amount extracting unit 12.

The feature amount extracting unit 12 acquires an image signal indicating the inference target image from the image signal acquiring unit 11.

The feature amount extracting unit 12 extracts the feature amount of the detection target object appearing in the inference target image from the image signal (step ST12 in FIG. 8).

Specifically, the feature amount extracting unit 12 provides an image signal to the first learning model 1*a*, and acquires, from the first learning model 1*a*, a feature vector indicating a high-dimensional feature amount of the detection target object appearing in the inference target image.

The feature amount extracting unit 12 outputs the feature vector to the three-dimensional position estimating unit 15.

The three-dimensional position estimating unit 15 acquires a feature vector from the feature amount extracting unit 12.

The three-dimensional position estimating unit 15 acquires a plurality of feature vectors indicating representative feature amounts from the representative feature amount storing unit 14.

The three-dimensional position estimating unit 15 estimates the three-dimensional position of the detection target object appearing in the inference target image on the basis of the feature vector indicating the plurality of representative feature amounts and the feature vector acquired from the feature amount extracting unit 12 (step ST13 in FIG. 8).

Specifically, the three-dimensional position estimating unit 15 calculates each of the similarities between the feature vectors indicating the plurality of representative feature amounts and the feature vector acquired from the feature amount extracting unit 12.

The three-dimensional position estimating unit 15 specifies the highest similarity among the similarities between the representative feature amounts registered as many as the number of targets to be recognized and the inference time feature amount, and specifies the representative feature amount corresponding to the highest similarity. By specifying the representative feature amount, the three-dimensional position estimating unit 15 can determine which class it belongs to.

The three-dimensional position estimating unit 15 determines the class having the most similar representative feature amount as the class to which the detection target object belongs. For example, in a case where both the representative feature amount and the inference time feature amount use the TIR image as an input, class classification beyond the domain at the time of learning becomes possible.

Furthermore, since the inference time feature amount includes the presence range (Objectness) of the detection target object included in the image input at the time of inference, it is possible to represent the spatial presence position of the object by converting the description method of the high-dimensional feature of the inference time feature amount from the Tensor or the like into the two-dimensional space. As a result, in a case where the task at the time of learning is image classification, recognition beyond the task becomes possible.

When the representative feature amount having the highest similarity is, for example, the representative feature amount of a drone, the three-dimensional position estimating unit 15 recognizes that the type of the detection target object appearing in the inference target image is a drone, and recognizes the region where the detection target object is present.

When the representative feature amount having the highest similarity is, for example, the representative feature amount of a flying car, the three-dimensional position estimating unit 15 recognizes that the type of the detection target object appearing in the inference target image is a flying car, and recognizes the region where the detection target object is present.

When the representative feature amount having the highest similarity is, for example, a representative feature amount of a helicopter, the three-dimensional position estimating unit 15 recognizes that the type of the detection target object appearing in the inference target image is a helicopter, and recognizes the region where the detection target object is present.

The three-dimensional position estimating unit 15 outputs an estimation result of the three-dimensional position to the change analysis unit 16.

In addition, the three-dimensional position estimating unit 15 generates display data indicating an estimation result of the three-dimensional position, and outputs the display data to the display device 5.

Note that the three-dimensional position estimating unit 15 outputs the estimation result of the three-dimensional position to the change analysis unit 16 every time the image signal acquiring unit 11 acquires an image signal. When the sampling time at which the image signal acquiring unit 11 acquires the image signal is $t_n$, the three-dimensional position estimating unit 15 outputs the estimation result of the three-dimensional position at the sampling time $t_n$ to the change analysis unit 16.

The change analysis unit 16 acquires the estimation result of the three-dimensional position at the sampling time $t_n$ from the three-dimensional position estimating unit 15, and provides the estimation result of the three-dimensional position to the second learning model 2*a*.

Note that, in a case where it is necessary to acquire position data indicating a temporal change in the three-dimensional position of the drone, the change analysis unit 16 provides an estimation result of the three-dimensional position of the drone to the second learning model 2*a*.

In a case where it is necessary to acquire position data indicating a temporal change in the three-dimensional position of the flying car, the change analysis unit 16 provides an estimation result of the three-dimensional position of the flying car to the second learning model 2a.

In a case where it is necessary to acquire position data indicating a temporal change in the three-dimensional position of the helicopter, the change analysis unit 16 provides an estimation result of the three-dimensional position of the helicopter to the second learning model 2a.

The second learning model 2a is a learning model that learns a three-dimensional position and regresses a temporal change in the three-dimensional position. As a result, when the estimation result of the three-dimensional position at the sampling time $t_n$ is provided from the change analysis unit 16, the second learning model 2a outputs the position data indicating the temporal change in the three-dimensional position of the detection target object at the future sampling time corresponding to the estimation result to the change analysis unit 16.

The change analysis unit 16 acquires, from the second learning model 2a, position data indicating a temporal change in the three-dimensional position of the detection target object at future sampling times $t_{n+1}$ to $t_{n+3}$, for example, as position data indicating a temporal change in the three-dimensional position of the detection target object at future sampling times.

In the inference device 4 illustrated in FIG. 1, the change analysis unit 16 acquires position data indicating a temporal change in the three-dimensional position of the detection target object using the second learning model 2a. However, this is merely an example, and the change analysis unit 16 may acquire position data indicating a temporal change in the three-dimensional position of the detection target object by providing an estimation result of the three-dimensional position of the detection target object at the sampling time $t_n$ to a prediction function for predicting the three-dimensional position of the detection target object.

The change analysis unit 16 determines whether or not the detection target object falls on the basis of the position data.

For example, if the future position of the detection target object indicates the position on the ground, the change analysis unit 16 determines that the detection target object will fall. If the future position of the detection target object does not indicate the position on the ground, the change analysis unit 16 determines that the detection target object does not fall.

In addition, the change analysis unit 16 determines whether the detection target object is, for example, hovering, ascending, descending, advancing, or retreating as processing of classifying the detection target object into multiple classes on the basis of the position data.

The change analysis unit 16 generates display data indicating an analysis result of the temporal change in the three-dimensional position of the detection target object, and outputs the display data to the display device 5.

In addition, the change analysis unit 16 generates display data indicating a determination result of the above determination processing, and outputs the display data to the display device 5.

The display device 5 displays an estimation result of the three-dimensional position on a display (not illustrated) according to the display data output from the three-dimensional position estimating unit 15. The estimation result of the three-dimensional position indicates the type of the detection target object and the three-dimensional position of the detection target object.

In addition, as illustrated in FIG. 9, the display device 5 causes a display (not illustrated) to display an analysis result of the temporal change in the three-dimensional position of the detection target object and a determination result of whether or not the detection target object falls according to the display data output from the change analysis unit 16.

FIG. 9 is an explanatory diagram illustrating a temporal change in a three-dimensional position of a detection target object.

FIG. 9 illustrates the position of the detection target object in the x direction at time t and the position of the detection target object in the y direction at time t.

In FIG. 9, the x direction is a direction orthogonal to the imaging direction of the camera 3, and is, for example, a direction horizontal to the ground.

The y direction is a direction parallel to the imaging direction of the camera 3. The z direction is a direction orthogonal to the imaging direction of the camera 3, and is, for example, a direction perpendicular to the ground.

In the example of FIG. 9, since the position of the detection target object in the z direction is the position on the ground at a certain time, the determination result indicating that the detection target object falls is clearly indicated. In FIG. 9, the determination result indicating that the detection target object falls may be displayed as "a Message".

In the first embodiment described above, the inference device 4 is configured to include: the image signal acquiring unit 11 to acquire an image signal indicating an inference target image that is an image in which a detection target object appears in a case where one or more of a condition that a domain of the inference target image is different from a domain of a training image and a condition that a recognition task of the inference target image is different from a pre-learned task are satisfied; and the feature amount extracting unit 12 to provide the image signal acquired by the image signal acquiring unit 11 to the first learning model 1a in which learning of the training image has been completed, and acquire, from the first learning model 1a, an inference time feature amount that is obtained by combining a plurality of feature amounts of the detection target object appearing in the inference target image after each of the plurality of feature amounts is blurred, the inference time feature amount being to be used for inferring a three-dimensional position of the detection target object. The inference device 4 further includes: the three-dimensional position estimating unit 15 to perform estimation of a three-dimensional position of the detection target object appearing in the inference target image on the basis of a representative feature amount that is a registered feature amount of the detection target object appearing in an image for conversion in which each of a domain and a recognition task of the image is the same as that of the inference target image, and the inference time feature amount acquired by the feature amount extracting unit 12; and the change analysis unit 16 to analyze a temporal change in a three-dimensional position of the detection target object appearing in the inference target image on the basis of an estimation result of the three-dimensional position estimated by the three-dimensional position estimating unit 15. Therefore, the inference device 4 can analyze the temporal change in the three-dimensional position of the detection target object without causing the first learning model to learn in consideration of the state of the natural environment.

Furthermore, in the first embodiment, the inference device 4 is configured such that the image signal acquiring unit 11 acquires an image signal indicating an image for conversion, and the feature amount extracting unit 12 provides the image signal indicating the image for conversion to the first learning model 1a, and acquires, from the first learning model 1a, a representative feature amount that is obtained by combining a plurality of feature amounts of a detection target object appearing in the image for conversion after each of the plurality of feature amounts is blurred. In addition, the inference device 4 includes the representative feature amount registering unit 13 that registers the representative feature amount acquired by the feature amount extracting unit 12. Therefore, the inference device 4 can register the representative feature amount that can be used for estimating the three-dimensional position of the detection target object.

In the inference device 4 illustrated in FIG. 1, the feature amount extracting unit 12 provides an image signal to the first learning model 1a implemented by very deep CNNs, and acquires, from the first learning model 1a, a feature amount obtained by combining a plurality of feature amounts of a detection target object after each of the plurality of feature amounts is blurred.

In a case where the first learning model 1a is implemented by very deep CNNs, as described above, even if a domain or a detection target object of the inference target image indicated by the image signal provided to the input layer of the first learning model 1a is different from that of the training image, the difference in the feature vector output from the output layer is slight.

On the other hand, in a case where the first learning model 1a is implemented by a general neural network or the like, if a domain of the inference target image indicated by the image signal provided to the input layer of the first learning model 1a or the detection target object appearing in the inference target image is different from that of the training image, the difference in the feature vector output from the output layer may be large.

However, the domain of the image for conversion and the domain of the inference target image are the same. Therefore, even in a case where the first learning model 1a is implemented by a general neural network or the like, if the detection target object appearing in the inference target image is a normal object, the representative feature amount acquired by the feature amount extracting unit 12 at the time of domain conversion and the inference time feature amount acquired by the feature amount extracting unit 12 at the time of position estimation have substantially similar values.

On the other hand, if the detection target object appearing in the inference target image is an abnormal object, the representative feature amount acquired by the feature amount extracting unit 12 at the time of domain conversion and the inference time feature amount acquired by the feature amount extracting unit 12 at the time of position estimation have greatly different values.

Therefore, even in a case where the first learning model 1a is implemented by a general neural network or the like, the three-dimensional position estimating unit 15 can estimate the three-dimensional position of the detection target object with high accuracy.

Note that, in the present disclosure, any component of the embodiment can be modified, or any component of the embodiment can be omitted.

INDUSTRIAL APPLICABILITY

The present disclosure is suitable for an inference device, an inference method, and an inference program.

REFERENCE SIGNS LIST

1: model storage unit, 1a: first learning model, 2: model storage unit, 2a: second learning model, 3: camera, 4: inference device, 5: display device, 6: training data storing unit, 7: learning device, 11: image signal acquiring unit, 12: feature amount extracting unit, 13: representative feature amount registering unit, 14: representative feature amount storing unit, 15: three-dimensional position estimating unit, 16: change analysis unit, 21: image signal acquiring circuit, 22: feature amount extracting circuit, 23: representative feature amount registering circuit, 24: representative feature amount storing circuit, 25: three-dimensional position estimating circuit, 26: change analysis circuit, 31: memory, 32: processor, 41: training data acquiring unit, 42: learning processing unit, 51: training data acquiring circuit, 52: learning processing circuit, 61: memory, 62: processor

The invention claimed is:

1. An inference device comprising:
   memory storing processing instructions; and
   processing circuitry executing the processing instructions stored in the memory to:
   acquire an image signal indicating an inference target image that is an image in which a detection target object appears in a case where one or more of a condition that a domain of the inference target image is different from a domain of a training image and a condition that a recognition task of the inference target image is different from a pre-learned task are satisfied,
   provide the image signal to a first learning model in which learning of the training image has been completed, and acquire, from the first learning model, an inference time feature amount that is obtained by combining a plurality of feature amounts of the detection target object appearing in the inference target image after each of the plurality of feature amounts is blurred, the inference time feature amount being to be used for inferring a three-dimensional position of the detection target object,
   perform estimation of a three-dimensional position of the detection target object appearing in the inference target image on a basis of a representative feature amount that is a registered feature amount of the detection target object appearing in an image for conversion in which each of a domain and a recognition task of the image is the same as that of the inference target image, and the inference time feature amount, and
   analyze a temporal change in a three-dimensional position of the detection target object appearing in the inference target image on a basis of an estimation result of the three-dimensional position.

2. The inference device according to claim 1, wherein the processing circuitry further performs to acquire an image signal indicating the image for conversion,
   to provide the image signal indicating the image for conversion to the first learning model, and acquire, from the first learning model, a representative feature amount that is obtained by combining a plurality of feature amounts of the detection target object appearing in the image for conversion after each of the plurality of feature amounts of the detection target object appearing in the image for conversion is blurred, the representative feature amount being used for inferring a three-dimensional position of the detection target object, and
   to register the representative feature amount.

3. The inference device according to claim 1, wherein the processing circuitry compares representative feature amounts of a plurality of detection target objects having types and presence regions different from each other with the inference time feature amount to perform specification of a representative feature amount corresponding to the inference time feature amount among the representative feature amounts of the plurality of detection target objects, and estimates each of a type and a presence three-dimensional region of a detection target object appearing in the inference target image as recognition of the detection target object on a basis of a result of the specification of the representative feature amount.

4. The inference device according to claim 1, wherein the processing circuitry provides a result of the estimation of the three-dimensional position to a second learning model that learns a three-dimensional position and regresses a temporal change in the three-dimensional position, and acquires position data indicating a temporal change in the three-dimensional position of the detection target object from the second learning model.

5. An inference method comprising:

acquiring an image signal indicating an inference target image that is an image in which a detection target object appears in a case where one or more of a condition that a domain of the inference target image is different from a domain of a training image and a condition that a recognition task of the inference target image is different from a pre-learned task are satisfied;

providing the image signal to a first learning model in which learning of the training image has been completed, and acquiring, from the first learning model, an inference time feature amount that is obtained by combining a plurality of feature amounts of the detection target object appearing in the inference target image after each of the plurality of feature amounts is blurred, the inference time feature amount being to be used for inferring a three-dimensional position of the detection target object;

performing estimation of a three-dimensional position of the detection target object appearing in the inference target image on a basis of a representative feature amount that is a registered feature amount of the detection target object appearing in an image for conversion in which each of a domain and a recognition task of the image is the same as that of the inference target image, and the inference time feature amount; and analyzing a temporal change in a three-dimensional position of the detection target object appearing in the inference target image on a basis of a result of the estimation of the three-dimensional position.

6. A non-transitory computer-readable medium storing a program including instructions that, when executed by a processor, causes a computer to execute a process, the process including:

to acquire an image signal indicating an inference target image that is an image in which a detection target object appears in a case where one or more of a condition that a domain of the inference target image is different from a domain of a training image and a condition that a recognition task of the inference target image is different from a pre-learned task are satisfied;

to provide the image signal to a first learning model in which learning of the training image has been completed, and acquire, from the first learning model, an inference time feature amount that is obtained by combining a plurality of feature amounts of the detection target object appearing in the inference target image after each of the plurality of feature amounts is blurred, the inference time feature amount being to be used for inferring a three-dimensional position of the detection target object;

to perform estimation of a three-dimensional position of the detection target object appearing in the inference target image on a basis of a representative feature amount that is a registered feature amount of the detection target object appearing in an image for conversion in which each of a domain and a recognition task of the image is the same as that of the inference target image, and the inference time feature amount; and to analyze a temporal change in a three-dimensional position of the detection target object appearing in the inference target image on a basis of a result of the estimation of the three-dimensional position.

* * * * *